(12) United States Patent
Pradhan et al.

(10) Patent No.: US 6,724,868 B2
(45) Date of Patent: Apr. 20, 2004

(54) TELEPHONE-ENABLED INTERNET ACCESS SYSTEM

(75) Inventors: Salil Pradhan, Santa Clara, CA (US); Wei-Ying Ma, Fremont, CA (US); Glenn C. Steiner, Los Altos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 430 days.

(21) Appl. No.: 09/824,989

(22) Filed: Apr. 2, 2001

(65) Prior Publication Data

US 2002/0142786 A1 Oct. 3, 2002

(51) Int. Cl.[7] .............................................. H04M 11/00
(52) U.S. Cl. ................ 379/90.01; 379/88.17; 370/352
(58) Field of Search ................... 379/90.01, 93.05, 379/93.25, 100.11, 88.17, 88.18, 88.01, 88.04, 88.12, 88.13, 88.15, 93.26, 93.15; 370/352, 353; 709/206

(56) References Cited

U.S. PATENT DOCUMENTS 5,884,262 A * 3/1999 Wise et al. ............ 704/270.01

* cited by examiner

Primary Examiner—Melur Ramakrishnaiah

(57) ABSTRACT

A phone-enabled Internet access system is described. The access system includes an Internet-enabled rendering system coupled to an external Internet to render web pages received via the Internet. The access system also includes a dial-up server coupled to the Internet and a telephone network to receive a voice signal from a remote telephone via the telephone network. The voice signal contains a first web address indicating a desired web page and a second web address indicating the Internet-enabled rendering system on which the desired web page is to be rendered. The dial-up server extracts the web addresses from the voice signal and causes the desired web page to be retrieved from a remote web site to the rendering system via the external Internet for rendering. A phone-enabled Internet access gateway system is also described.

20 Claims, 4 Drawing Sheets

TELEPHONE-ENABLED INTERNET ACCESS SYSTEM

BACKGROUND OF THE INVENTION

1. Field of the Invention

The present invention pertains to Internet and World Wide Web ("WWW"). More particularly, this invention relates to a telephone-enabled Internet access system such that Internet-related services can be provided to a person wherever the person has access to a telephone.

2. Description of the Related Art

As is known, the Internet typically refers to a number of data service systems connected together via a high speed interconnect network. Each data service system typically includes web servers that host contents for various customers. The web servers can also host applications. Each of the data service systems is typically implemented by a computer system (e.g., a server computer system). A number of remote user terminals may be connected to a data service system via an interconnect network. This allows users at the user terminals to access the contents hosted in various data service systems. Each user terminal is typically implemented by a computer system (e.g., a personal computer) and is equipped with a web browser that allows the user terminal to access the contents and/or applications hosted in various data service systems.

Such a prior art scheme, however, bears disadvantages. One disadvantage is that the scheme requires the user terminals for Internet accessing. If a user at a particular place wants to access the Internet, the user must have a user terminal at that place. Without the user terminal, no Internet access can be offered to the user. However, unlike telephones, the user terminals are not readily available at anytime and anywhere in today's world.

Another disadvantage is that the scheme lacks flexibility, mobility, and convenience for a user to access the Internet. As is known, the user terminal is typically a personal computer. Although the personal computer can be made small and portable (e.g., a notebook computer), it is still inconvenient for the user to carry the machine around. Further miniaturization of the computer (e.g., palm-top personal organizer) typically takes away some important components (e.g., floppy drive) of the machine, and/or makes the machine not user friendly (e.g., shrinking the display or keyboard so it is really uncomfortable for the user to use the machine). Physical constraints may also limit or prevent further miniaturization.

Moreover, peripheral devices (e.g., printers, scanners, or and projectors) are typically left behind when a user carries a computer around. When the user uses the computer as a user terminal to access the Internet and wants to print or projects a particular content, the user must also carry the peripheral devices along with the computer. For example, if the user anticipates the use of a printer and a projector at a remote location, the user must carry both along with the computer. This adds inconvenience to the user and restricts mobility of the user terminal. If the user connects the computer to a borrowed projector or printer, the user has to make sure that the computer has the appropriate software for the projector or appropriate printer driver software to drive the borrowed printer.

Prior art schemes have been developed to provide mobile Internet access to Internet users. One such prior art scheme is through the use of cellular phones (or mobile phones). In this case, the cellular phone is equipped with Internet browser. Another example is through the use of the personal digital assistants (PDAs).

However, these prior art schemes also bear disadvantages. One disadvantage is that the mobile phones or PDAs typically have limited I/O (i.e., input/output) resource. For example, a cellular phone typically has a very small display screen. So is a PDA. No other I/O service (e.g., printing) typically can be attached to the cellular phone or PDA. In addition, one has to carry a cellular phone or PDA with him or her in order to access the Internet.

SUMMARY OF THE INVENTION

One feature of the present invention is to provide mobile Internet access to Internet users.

Another feature of the present invention is to allow a person having access to a telephone to also have access to Internet through the telephone.

A further feature of the present invention is to provide phone-enabled Internet access and navigation to Internet users.

A still further feature of the present invention is to provide Internet access to a user wherever the user has access to a telephone and I/O resource.

Below described is a phone-enabled Internet access system that includes an Internet-enabled rendering system coupled to an external Internet to render web pages received via the Internet. The access system also includes a dial-up server coupled to the Internet and a telephone network to receive a voice signal from a remote telephone via the telephone network. The voice signal contains a first web address indicating a desired web page and a second web address indicating the Internet-enabled rendering system on which the desired web page is to be rendered. The dial-up server extracts the web addresses from the voice signal and causes the desired web page to be retrieved from a remote web site to the rendering system via the external Internet for rendering.

A phone-enabled Internet access gateway system is also described below. The gateway system includes a voice interface coupled to an external telephone network to receive voice signal from a remote telephone via the external telephone network. The system also includes a request recognition system coupled to the voice interface to receive the voice signal, and to extract a first web address designating a desired web page at a remote web site and a second web address designating a desired Internet-enabled rendering system on which the desired web page can be rendered. A web access module is then coupled to the request recognition system to receive the web addresses. The web access module causes the desired web page to be rendered on the remote rendering system at the second web address.

Other features and advantages of the invention will become apparent from the following detailed description, taken in conjunction with the accompanying drawings, illustrating by way of example the principles of the invention.

DETAILED DESCRIPTION OF THE INVENTION

Figure 1:
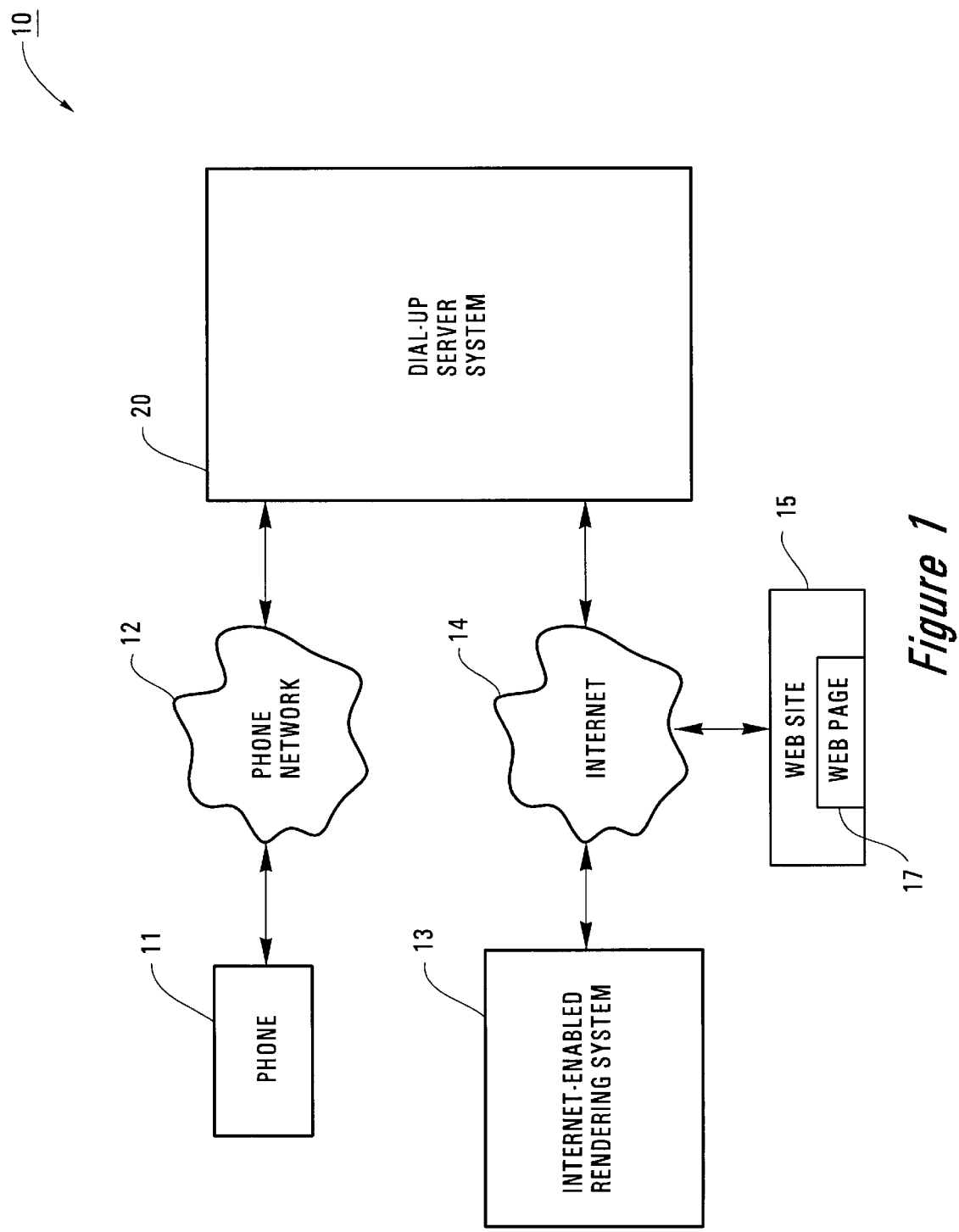
FIG. 1 schematically shows a phone-enabled Internet access system that implements one embodiment of the present invention.

FIG. 1 shows a phone-enabled Internet access system 10 that implements one embodiment of the present invention. The Internet access system 10 includes a dial-up server system 20 and an Internet-enabled rendering system 13.

As will be described in more detail below, the rendering system 13 is an Internet-enabled rendering system. This means that the rendering system 13 is connected to an external Internet 14, which is the global Internet. The rendering system 13 includes a device-specific rendering module 25 and a web access module 26. The web access module 26 allows the rendering system 13 to access remote web sites or be accessed by other Internet-enabling systems via the Internet 14. In addition, the web access module 26 allows the rendering system 13 to receive web pages from external remote web sites via the Internet 14. The web pages are then rendered by the device-specific rendering module 25. The Internet-enabled rendering system 13 is assigned with a web address that identifies the rendering system 13 in the cyberspace.

The dial-up server system 20 is connected to a telephone network 12 to receive voice and/or tone signals from a remote telephone 11 connected to the telephone network 12. The voice and/or tone signals contain a first web address indicating a desired web page 17 and a second web address indicating the Internet-enabled rendering system 20 on which the desired web page 17 is to be rendered. The dial-up server system 20 extracts the web addresses from the voice and/or tone signals.

In addition, the dial-up server system 20 is connected to the Internet 14. This connection allows the dial-up server system 20 to cause the desired web page 17 to be retrieved from the remote web site 15 to the rendering system 13 via the external Internet 14 for rendering. The dial-up server system 20 achieves this by accessing the remote web site 15 with first web address. The dial-up server system 20 then sends the retrieved web page 17 to the rendering system 13 via the Internet 14. Alternatively, the dial-up server system 20 sends the web address of the desired web page 17 to the rendering system 13. This allows the rendering system 13 to retrieve the web page 17 from the remote web site 15 via the Internet 14. The phone-enabled Internet access system 10 will be described in more detail below, also in conjunction with FIGS. 1 through 4.

Referring again to FIG. 1, the phone-enabled Internet access system 10 is connected to the telephone network 12 and the Internet 14. The phone network 12 is connected to telephones. FIG. 1 only schematically shows one such telephone 11 for illustration purposes.

In one embodiment, the telephone network 12 is a conventional telephone network. In another embodiment, the telephone network 12 is a wireless telephone network. Alternatively, the network 12 is a hybrid of wireless and wired telephone networks. The telephone 11 can be a cellular phone or a regular conventional phone, such as a touch-tone phone or a pulse dialing phone. In other words, the telephone 11 can be any commercially available telephone.

As can be seen from FIG. 1, the Internet-enabled rendering system 13 is connected to the Internet 14, and is capable of communicating with other systems (e.g., the remote web site 15 or the dial-up server system 20) connected to the Internet 14. An open standard protocol is used for communication among various systems, including the rendering system 13, via the Internet 14.

In one embodiment, the open standard protocol is the Hyper Text Transport Protocol (HTTP). Alternatively, other open standard protocols can be employed.

The Internet-enabled rendering system 13 can be any image rendering system that renders (e.g., prints, displays, projects, or plays) any content retrieved via the Internet 14. The retrieved content can be image, text, video, audio, and/or application. The retrieved content via the Internet 14 will be referred to as web pages hereinafter. As is known, each web page has a corresponding web address such that the web page can be accessed and retrieved via the Internet 14.

The rendering system 13 can be any kind of rendering system. For example, the rendering system 13 can be a large screen display. As a further example, the rendering system 13 can be a printer or a projector. Alternatively, the rendering system 13 can be a personal digital assistant (PDA) or a pocket/miniature personal computer, an Internet appliance such as an Internet TV or Internet radio, or even a cellular phone with a display.

If the rendering system 13 is an Internet TV or radio, then the rendering system 13 can receive web broadcast in MPEG (Motion Picture Experts Group) or MP3 format. Then the downloaded content is played by the rendering system 13. If the rendering system 13 is a display, a projector, or a printer, then the rendering system 13 can download a web page (e.g., a map, a text file, or an image) and display or print the downloaded web page.

In addition, the rendering system 13 may also include input functions such as a scanner, a fax machine, a keyboard, and a mouse control. Furthermore, the rendering system 13 can simply be a computer system.

In one embodiment, the rendering system 13 is a stationary system. This means that the rendering system 13 is fixed at the location where it is placed. In this case, the rendering system 13 can be implemented as a pay-as-you-use system (i.e., like a pay-phone). This means that the Internet-enabled rendering system 13 can be placed in various public or private locations (e.g., conference or meeting rooms, hotel rooms, hotel lobbies, airports, bus or train terminals, shopping centers, convention centers, etc.), just like a pay-phone. In another embodiment, the rendering system 13 can be a portable system. The structure of the Internet-enabled rendering system 13 is shown in FIG. 2, which will be described in more detail below.

Figure 2:
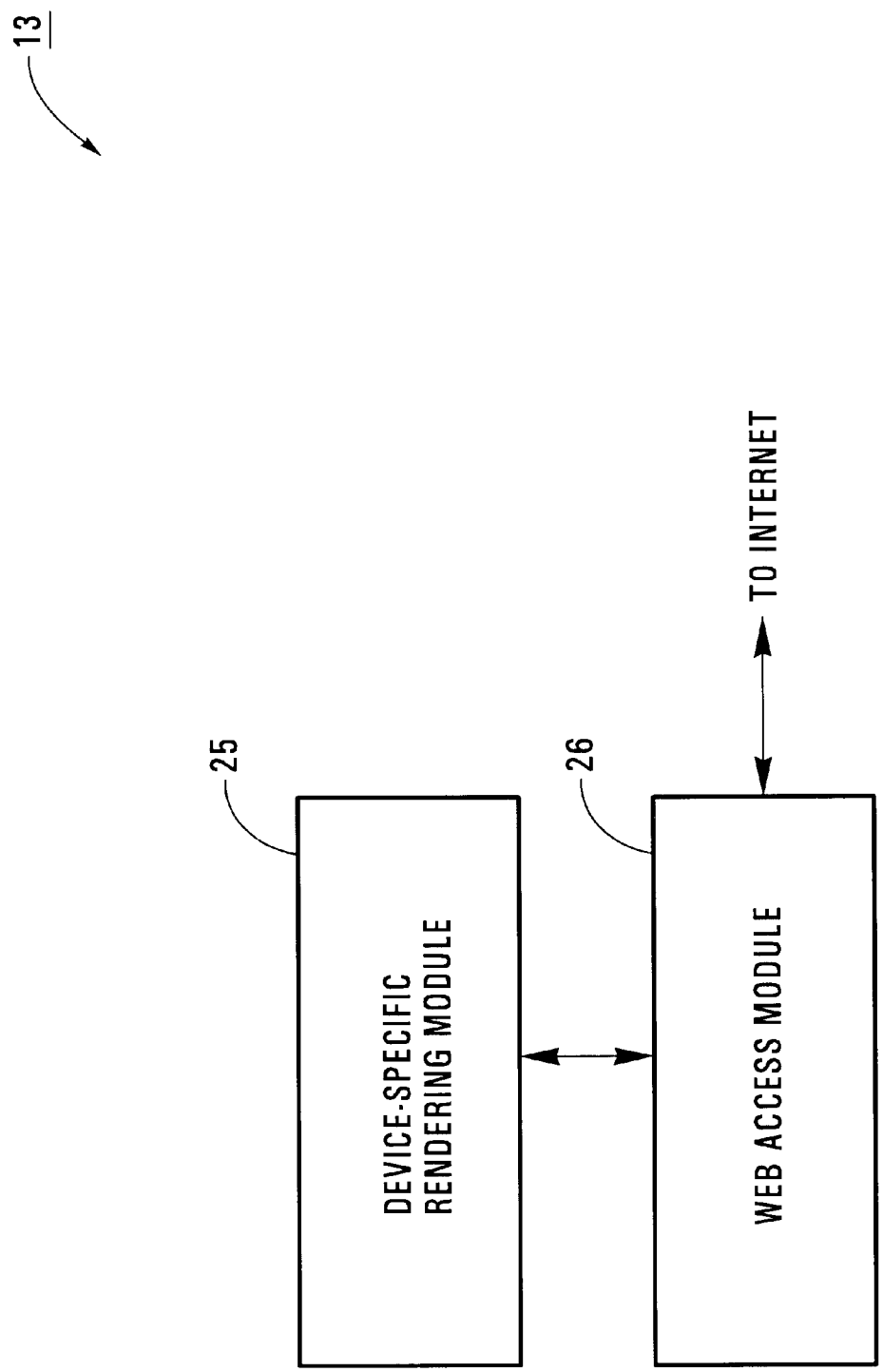
FIG. 2 shows the Internet-enabled rendering system of the phone-enabled Internet access system of FIG. 1.

Referring to FIG. 2, the structure of the Internet-enabled rendering system 13 is shown that includes a device-specific rendering module 25 and a web access module 26. The web access module 26 is connected to the external Internet 14 (shown in FIG. 1) and the device-specific rendering module 25. The device-specific rendering module 25 is implemented using known technology and its structure depends on the type of the rendering system 13. For example, if the rendering system 13 is implemented as a printer system, then the module 25 is a printer. If the rendering system 13 is implemented as a display system, then the module 25 is a display (e.g., CRT display or LED or LCD display). If the rendering system 13 is a projector system, then the module 25 is a projector. Similarly, if the rendering system 13 is an Internet radio or TV, then the module 25 implements all video and/or audio signal processing and playing functions.

The web access module 26 of the rendering system 13 enables the rendering system 13 to be an Internet-enabled rendering system. This means that the web access module 26 can receive web pages sent by other systems (e.g., the dial-up server system 20) via the Internet 14. The web access module 26 then sends the received web page to the rendering module 25 for rendering. In addition, the web access module 26 can also provide responses to a remote requesting server system (e.g., the dial-up server system 20) via the Internet 14 in response to a request from that remote server system. For example, if the dial-up server system 20 wants to know the rendering ability of the rendering system 13, a request will be sent from the dial-up server system 20 via the Internet 14 to the web access module 26 of the rendering system 13. The web access module 26 then queries the rendering module 25 for its rendering ability (e.g., resolution and size of display, paper tray and print resolution choices). The web access module 26 then sends the queried results back to the requesting server system 20 via the Internet 14. This means that the web access module 26 may include both the web browsing and the web server functions. The web access module 26 can be implemented using known technology.

Referring back to FIG. 1, the remote web site 15 is shown to be connected to the Internet 14 and can be accessed by other Internet-enabled systems (e.g., the rendering system 13 or the dial-up server 20) that are also connected to the Internet 14. The remote web site 15 includes the desired web page 17. This means that the web page 17 is to be accessed and retrieved by a user using the telephone 11 to the rendering system 13 for rendering. The remote web site 15 is hosted by a web server (not shown in FIG. 1). The construction of a web site in a web server is done using known technology and will not be described in more detail below.

FIG. 1 only shows one remote web site 15 for illustration purposes. In practice, many more remote web sites are connected to the Internet 14. As a matter of fact, the Internet 14 is formed by many web servers interconnected together.

In addition, FIG. 1 only shows the desired web page 17 for illustration purposes. In practice, the web site 15 may contain many web pages, each being uniquely identified with a web address. A web address is basically a Universal Resource Locator (i.e., URL). Thus, the terms are interchangeably used hereinafter.

Each of the web pages in the web site 15 can be an image, a text file, a video program or clip, a stream of audio, and/or an application. Each web page has a corresponding web address such that the web page can be accessed and retrieved via the Internet 14.

The dial-up server system 20 is connected to the phone network 12 and the Internet 14, as described above. This means that the dial-up server system 20 is assigned with a telephone number (e.g., 1-800-000-0000), and can be accessed by external telephones (e.g., the phone 11) by simply dialing that number.

The dial-up server system 20 functions as a gateway for the user at the telephone 11 to access remote web sites (e.g., the remote web site 15) via the Internet 14. In other words, the telephone 11 does not have any web or Internet accessing function (e.g., web browser) and yet, the user at the telephone 11 can still access the Internet 14. This is achieved through the use of the dial-up server system 20, in accordance with one embodiment of the present invention.

The dial-up server system 20 is a voice-enabled web access gateway or server system. It has web and Internet accessing functionality. In addition, it is voice-enabled. This means that the dial-up server system 20 can extract or recognize web addresses and/or browsing commands from voice signals received. The dial-up server system 20 receives the voice signals from an external phone (e.g., the phone 11) via the phone network 12. This allows any user with access to a phone (either conventional phone or a cellular phone) to request access to remote web sites via the Internet 14. The operation of the dial-up server system 20 with respect to other systems is described below.

During operation, a user first locates a rendering system (e.g., the rendering system 13) at which the user can receive the requested web pages. When the user locates the rendering system 13, the user records the web address assigned to the rendering system 13. As described above, the rendering system 13 is identifiable with a unique web address. The web address of the rendering system 20 can be recorded by the user in many ways. One traditional way is to label the web address of the rendering system 13 on the exterior of the rendering system 13 (or to display the web address in any other ways) so the user can see it. Another way is to put a beacon near the rendering system 13. The beacon stores the web address of the rendering system 13 and emits the web address. Anyone with a beacon receiver can receive the transmission. Since the phone 11 is to be used to access the dial-up server system 20, the web address stored in the beacon is in the voice or tone form. This means that each symbol of the web address is represented by a frequency tone or voice. In this case, the beacon receiver can simply be a voice recorder.

The user then dials number of the dial-up server system 20 using the phone 11 to connect to the dial-up server system 20 via the network 12. Once the connection is established, the user can transmit the web address of the desired web page and the web address of the rendering system 13 (at which the desired web address 17 is to be rendered) to the dial-up server system 20. Again, the web addresses are in the voice form. This means that each symbol of the web addresses is either represented by a voice pattern or a frequency tone. The user can pronounce the voice pattern or dial a key in order to transmit the web addresses. In addition, the user can also transmit browsing commands (e.g., Back, Forward, Refresh, Home, Scroll-Up, and Scroll-Down) or other instructions to the dial-up server system 20 via the telephone 11.

The dial-up server system 20 extracts or recognizes the web addresses and/or browsing commands and instructions from the voice transmission by the user via the telephone 11. The dial-up server system 20 then causes the desired web page 17 to be retrieved and rendered by the rendering system 13. There are a number of embodiments to achieve this process.

In one embodiment, the dial-up server system 20 uses the extracted web address of the desired web page 17 to access the web site 15 and to retrieve the desired web page 17. The dial-up server system 20 then pushes the retrieved web page 17 to the rendering system 13 using the extracted web address of the rendering system 13. The dial-up server system 20 also uses the browsing commands or instructions to browse the Internet 14 or the web site 15.

Before the dial-up server system 20 pushes the desired web page 17, the dial-up server system 20 can access the rendering system 20 with the extracted web address of the rendering system 13 to query about the rendering ability or requirements of the rendering system 13. The dial-up server system 20 then reconfigures or reformats the desired web page 17 to fit the rendering requirements of the rendering system 13.

If the remote web site 15 is also voice-enabled, the user at the phone 11 can also receive a voice reply as well as the written web content to be rendered by the rendering system 13. The dial-up server system 20 separates voice reply from the non-voice reply.

In another embodiment, the dial-up server system 20 sends the web address of the desired web page 17 directly to the rendering system 13. The rendering system 13 then accesses the web site 15 to retrieve the desired web page 17 directly. In this case, any web browsing commands or instructions are also passed from the dial-up server 20 to the rendering system 13.

Figure 3:
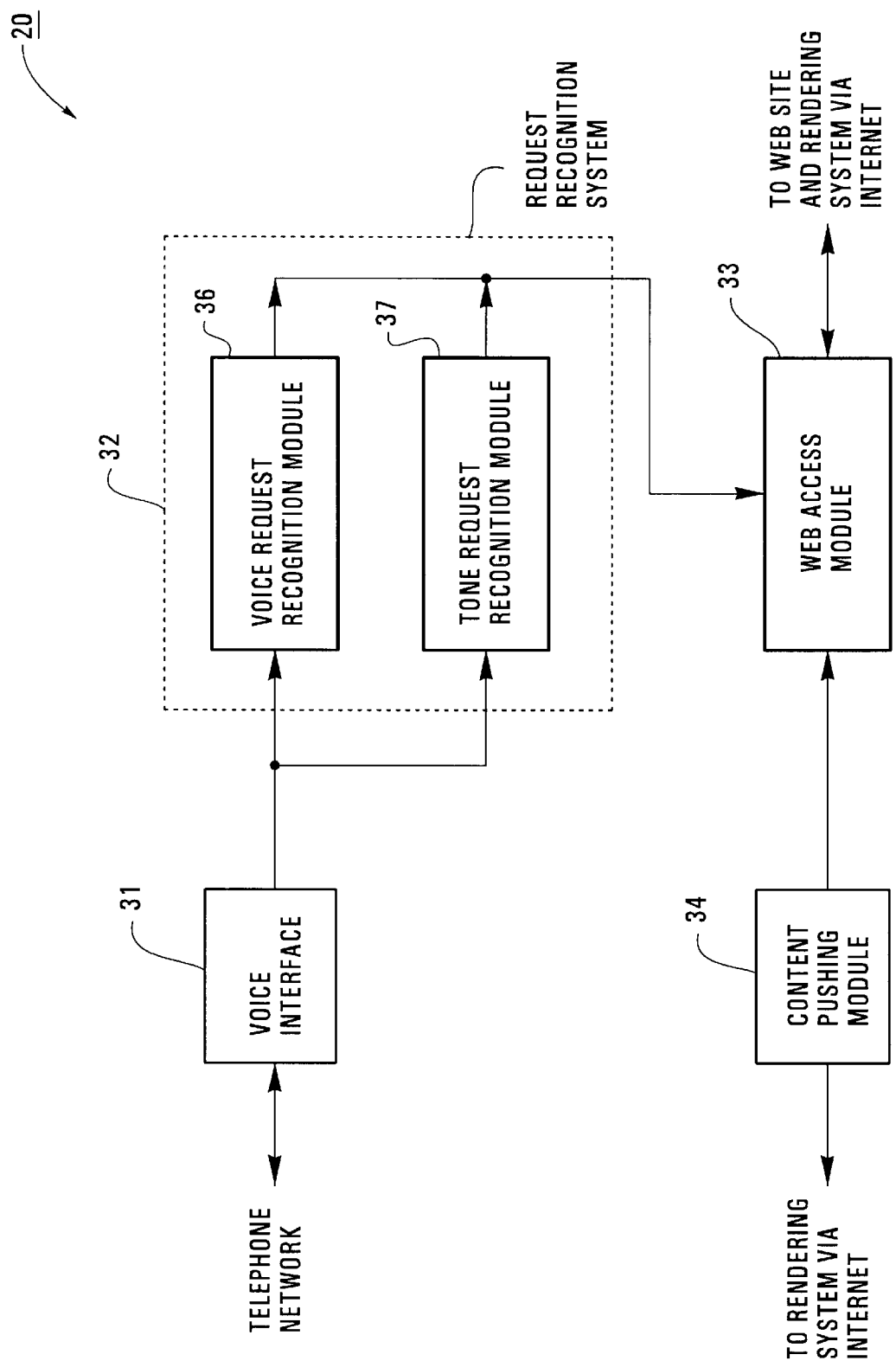
FIG. 3 shows the structure of the dial-up server system of the phone-enabled Internet access system of FIG. 1 in accordance with one embodiment of the present invention.

Referring to FIG. 3, the structure of the dial-up server system 20 in accordance with one embodiment of the present invention is shown. As can be seen from FIG. 3, the dial-up server system 20 includes a voice interface 31. The voice interface 31 is provided to interface the dial-up server system 20 with the external telephone network 12 (see FIG. 1). This allows the dial-up server system 20 to receive voice and tone signals via the phone network 12 (FIG. 1). The voice interface 31 can be implemented using known technology.

The dial-up server system 20 also includes a request recognition system 32. The request recognition system 32 is used to extract or recognize web addresses and/or browsing commands or instructions from the voice signals passed by the voice interface 31. The request recognition system 32 includes a voice request recognition module 36 and a tone request recognition module 37, each of which receives the voice signals from the voice interface 31. The voice request recognition module 36 is used to recognize web addresses and browsing commands contained in the voice signals. The tone request recognition module 37 is used to recognize web addresses and browsing commands contained in the frequency tone signals. The voice and tone request recognition modules 36-37 can be implemented using known technology. For example, speech or tone recognition technology can be used to construct each of the modules 36 and 37.

The dial-up server system 20 also includes a web access module 33. This module 33 is used to browse the Internet 14 and the web site 15 to locate and retrieve the desired web page 17. In addition, the web access module 33 can also accesses the rendering system 13 (FIG. 1). Thus, the web access module 33 enables the dial-up server system 20 to be Internet-enabled. This means that the web access module 33 can receive web pages sent by other systems (e.g., the web site 15) via the Internet 14. In addition, the web access module 33 can also access other Internet-enabled system (e.g., the rendering system 13) to request information from the accessed system. Moreover, the web access module 33 can also pass the retrieved web content (e.g., web page 17) to a remote rendering system (e.g., the rendering system 13) via the Internet 14. This means that the web access module 33 may include both the web browsing and the web server functions. The web access module 33 can be implemented using known technology.

Figure 4:
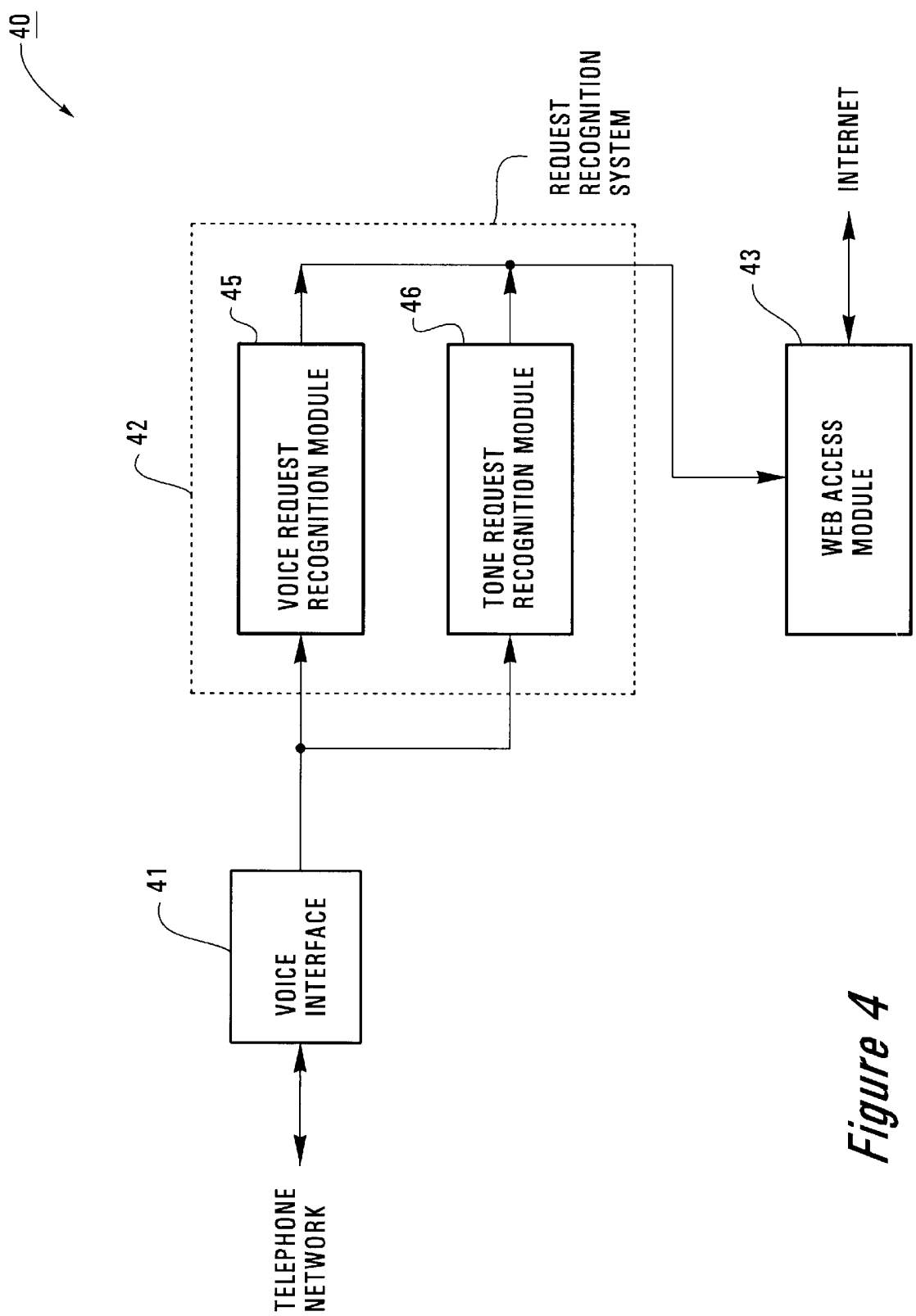
FIG. 4 shows the structure of the dial-up server system of the phone-enabled Internet access system of FIG. 1 in accordance with another embodiment of the present invention.

FIG. 4 shows the structure of a dial-up server system 40, which implements the dial-up server 20 of FIG. 1 in accordance with another embodiment of the present invention. As can be seen from FIGS. 3 and 4, the difference between the two different embodiments of the dial-up server system 20 is that the server system 40 in FIG. 4 does not include any content pushing module. This means that the web access module 43 of the dial-up server 40 does not access the remote web site 15 (FIG. 1) for the desired web page 17 (FIG. 1). Instead, the web access module 43 of the dial-up server system 40 only sends the web address of the desired web page 17 (FIG. 1) to the rendering system 13 (FIG. 1) via the Internet 14. In this case, the web access module in the rendering system 13 (i.e., the web access module 26 in FIG. 2) will need to access the remote web site 15 with the web address and retrieve the desired web page 17.

As for the voice interface 41, the request recognition system 42, their functions and structures are the same as the voice interface 31 of FIG. 3 and the request recognition system 32 of FIG. 3.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A phone-enabled Internet access system, comprising:
   an Internet-enabled rendering system coupled to an external Internet to render web pages received via the Internet;
   a dial-up server coupled to the Internet and a telephone network to receive a voice signal from a remote telephone via the telephone network, wherein the voice signal contains a first web address indicating a desired web page and a second web address indicating the Internet-enabled rendering system on which the desired web page is to be rendered, wherein the dial-up server extracts the web addresses from the voice signal and causes the desired web page to be retrieved from a remote web site to the rendering system via the external Internet for rendering.

2. The system of claim 1, wherein the dial-up server functions as a voice-enabled gateway to the Internet such that Internet-related services can be provided to a person wherever the person has access to a telephone.

3. The system of claim 1, wherein the Internet-enabled rendering system further comprises a device-specific rendering module for rendering the desired web page and a web access module for communicating with the dial-up server and receiving the desired web page via the external Internet.

4. The system of claim 3, wherein device-specific rendering module can be selected from a group comprising a printer, a facsimile machine, a display, a radio, and a projector.

5. The system of claim 1, wherein the voice signal also contains voice commands for browsing.

6. The system of claim 1, wherein the dial-up server retrieves the desired web page from the remote web site via the external Internet, wherein the dial-up server then sends the desired web page to the rendering system at the second web address via the Internet for rendering.

7. The system of claim 6, wherein the dial-up server further comprises
   a voice interface that functions as an interface for the dial-up server with the external telephone network such that the voice signal from the remote telephone can be received in the dial-up server;
   a request recognition system coupled to the voice interface to receive the voice signal from the voice interface, and to extract the web addresses from the voice signal;
   a web access module coupled to the request recognition system to receive the web addresses, and to access the remote web site for the desired web page at the first web address, wherein the web access module also accesses the Internet-enabled rendering system such that the desired web page can be sent to the Internet-enabled rendering system for rendering;

a content pushing module that sends the desired web page to the Internet-enabled rendering system via the external Internet.

8. The system of claim 7, wherein the web access module queries the Internet-enabled rendering system for its ability to render the desired web page, and causes the content pushing module to tailor the desired web page to the rendering ability of the rendering system.

9. The system of claim 1, wherein the dial-up server sends the first address in a message to the Internet-enabled rendering system via the external Internet such that the Internet-enabled rendering system retrieves the desired web page from the remote web site via the external Internet, and then renders the retrieved web page.

10. The system of claim 8, wherein the dial-up server further comprises a voice interface that functions as an interface for the dial-up server with the external telephone network such that the voice signal from the remote telephone can be received in the dial-up server;

a request recognition system coupled to the voice interface to receive the voice signal from the voice interface, and to extract the web addresses from the voice signal;

a web access module coupled to the request recognition system to receive the web addresses, wherein the web access module sends the first web address of the desired web page to the Internet-enabled rendering system such that the Internet-enabled rendering system can retrieve the desired web page for rendering.

11. A phone-enabled Internet access gateway system, comprising:

a voice interface coupled to an external telephone network to receive voice signal from a remote telephone via the external telephone network;

a request recognition system coupled to the voice interface to receive the voice signal, and to extract a first web address designating a desired web page at a remote web site and a second web address designating a desired Internet-enabled rendering system on which the desired web page can be rendered;

a web access module coupled to the request recognition system to receive the web addresses, wherein the web access module causes the desired web page to be rendered on the remote rendering system at the second web address.

12. The system of claim 11, wherein the voice signal also contains voice commands for browsing.

13. The system of claim 11, wherein the web access module retrieves the desired web page from the remote web site via the external Internet, wherein the web access module then sends the desired web page to the rendering system at the second web address.

14. The system of claim 13, further comprising a content pushing module that sends the desired web page to the Internet-enabled rendering system via the external Internet.

15. The system of claim 14, wherein the web access module queries the Internet-enabled rendering system for its ability to render the desired web page, and causes the content pushing module to tailor the desired web page to the rendering ability of the rendering system.

16. The system of claim 11, wherein the web access module sends the first address in a message to the Internet-enabled rendering system via the external Internet such that the Internet-enabled rendering system retrieves the desired web page from the remote web site via the external Internet, and then renders the retrieved web page.

17. A phone-enabled Internet access system, comprising:

a means for Internet-enabled rendering coupled to an external Internet, said means for Internet-enabled rendering for rendering web pages received via the Internet;

a means for receiving a voice signal from a remote telephone, said means for receiving a voice signal from a remote telephone being coupled to the Internet and a telephone network, wherein the voice signal contains a first web address indicating a desired web page and a second web address indicating the means for Internet-enabled rendering on which the desired web page is to be rendered, wherein the means for receiving a voice signal extracts the web addresses from the voice signal and causes the desired web page to be retrieved from a remote web site to the means for Internet-enabled rendering via the external Internet for rendering.

18. The system of claim 17, wherein the means for receiving a voice signal further comprises:

a means for interfacing voice data that functions as an interface for the means for receiving a voice signal with the external telephone network such that the voice signal from the remote telephone can be received in the means for receiving a voice signal;

a means for recognizing requests coupled to the means for receiving a voice signal to receive the voice signal from the means for interfacing voice data, and to extract the web addresses from the voice signal;

a means for accessing the web coupled to the means for recognizing requests to receive the web addresses, and to access the remote web site for the desired web page at the first web address, wherein the web access module also accesses the Internet-enabled rendering system such that the desired web page can be sent to the means for Internet-enabled rendering for rendering;

a means for content pushing that sends the desired web page to the means for Internet-enabled rendering via the external Internet.

19. The system of claim 18, wherein the means for accessing the web queries the means for Internet-enabled rendering for its ability to render the desired web page, and causes the means for content pushing to tailor the desired web page to the rendering ability of the rendering system.

20. The system of claim 18, wherein the means for accessing the web sends the first web address of the desired web page to the means for Intemet-enabled rendering such that the means for Internet-enabled rendering can retrieve the desired web page for rendering.

* * * * *